United States Patent
Nishiyama et al.

(10) Patent No.: US 10,530,004 B2
(45) Date of Patent: Jan. 7, 2020

(54) FUEL CELL STACK

(71) Applicant: HONDA MOTOR CO., LTD, Minato-ku, Tokyo (JP)

(72) Inventors: Tadashi Nishiyama, Wako (JP); Yuta Ikeda, Wako (JP); Masaharu Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 600 days.

(21) Appl. No.: 14/810,680

(22) Filed: Jul. 28, 2015

(65) Prior Publication Data
US 2016/0093911 A1    Mar. 31, 2016

(30) Foreign Application Priority Data

Sep. 30, 2014  (JP) ................. 2014-200218

(51) Int. Cl.
 *H01M 8/24*   (2016.01)
 *H01M 8/2485* (2016.01)
 *H01M 8/242*  (2016.01)
 H01M 8/1018  (2016.01)

(52) U.S. Cl.
 CPC ........ *H01M 8/2485* (2013.01); *H01M 8/242* (2013.01); *H01M 2008/1095* (2013.01); *H01M 2250/20* (2013.01); *Y02T 90/32* (2013.01)

(58) Field of Classification Search
None
See application file for complete search history.

(56) References Cited

FOREIGN PATENT DOCUMENTS

| JP | 5214289 | 6/2013 | |
|----|---------|--------|--|
| JP | 2014-072140 | * 4/2014 | ............. H01M 8/24 |

OTHER PUBLICATIONS

Japanese Office Action for Japanese Patent Application No. 2014-200218 dated Jan. 17, 2017.

* cited by examiner

*Primary Examiner* — Jonathan Crepeau
*Assistant Examiner* — Angela J Martin
(74) *Attorney, Agent, or Firm* — Amin, Turocy & Watson LLP (57) ABSTRACT

A first end plate that constitutes a fuel cell stack is provided with an oxidant gas supply manifold member that connects an oxidant gas inlet communication hole and a circular external pipe. The oxidant gas supply manifold member has a non-circular opening portion that communicates with the oxidant gas inlet communication hole and a circular opening portion that communicates with the circular external pipe. The non-circular opening portion is disposed within an area covered by the circular opening portion.

10 Claims, 5 Drawing Sheets

FUEL CELL STACK

CROSS REFERENCE TO RELATED APPLICATIONS

The present application claims priority under 35 U.S.C. § 119 to Japanese Patent Application No. 2014-200218, filed Sep. 30, 2014, entitled "Fuel Cell Stack." The contents of this application are incorporated herein by reference in their entirety.

BACKGROUND

1. Field

The present disclosure relates to a fuel cell stack that includes a stack of a plurality of fuel cells in each of which an electrolyte membrane-electrode assembly body in which electrodes are provided on both sides of an electrolyte membrane and separators are stacked.

2. Description of the Related Art

As an example, a solid polymer electrolyte fuel cell includes an electrolyte membrane-electrode assembly (MEA) in which an anode electrode is disposed on one surface side of an electrolyte membrane made of a polymer ion exchange membrane and a cathode electrode is disposed on the opposite surface side of the electrolyte membrane. An electrolyte membrane-electrode assembly is sandwiched between separators, thus forming an electricity generating cell. As is usually the case with fuel cells, a predetermined number of electricity generating cells are stacked and both ends of the stack in the stacking direction are provided with end plates, whereby a fuel cell stack, for example, a fuel cell stack for in-vehicle use that is to be incorporated into a fuel cell vehicle, is formed.

In the fuel cell, surfaces of a separator are provided with a fuel gas channel for causing a fuel gas to flow to the anode electrode and an oxidant gas channel for causing an oxidant gas to flow to the cathode electrode. Between separators adjacent to each other, a cooling medium channel for a cooling medium to flow is provided along planar directions of the separators.

A generally termed internal manifold type fuel cell provided with a fuel gas communication hole that extends through in the stacking direction and that distributes a fuel gas, an oxidant gas communication hole that extends through in the stacking direction and that distributes an oxidant gas, and a cooling medium communication hole that extends through in the stacking direction and that distributes a cooling medium is sometimes adopted. The fuel gas communication hole has a fuel gas inlet communication hole and a fuel gas outlet communication hole. The oxidant gas communication hole has an oxidant gas inlet communication hole and an oxidant gas outlet communication hole, and the cooling medium communication hole has a cooling medium inlet communication hole and a cooling medium outlet communication hole.

In the foregoing type of fuel cell, at least one of the two end plates is provided with fluid manifolds that are connected to the communication holes so as to supply or discharge a fluid (the fuel gas, the oxidant gas, or the cooling medium).

In many cases, each of the communication holes provided in a fuel cell has a non-circular shape, such as a rectangular shape that includes a square shape, a trapezoidal shape, etc., and external pipe connected to the fluid manifolds have hollow cylindrical shapes. Therefore, it is desired that the non-circular communication holes of a fuel cell be suitably connected to circular external pipes of external equipment. In this respect, for example, a fuel cell stack disclosed in Japanese Patent No. 5214289 is known.

In this fuel cell stack, one of the two end plates is provided with a manifold member made of resin which provides communication between a non-circular communication hole and a circular external pipe. The manifold member made of resin has a non-circular hollow cylinder portion that is provided within one of the end plates and that communicates with the non-circular communication hole and a circular hollow cylinder potion that communicates with the circular external pipe. Furthermore, a connecting cylinder portion that provides communication between the non-circular hollow cylinder portion and the circular hollow cylinder portion is provided within the thickness of the one end plate.

SUMMARY

The present application describes a fuel cell stack that, while having a simple and economical construction, allows a non-circular communication hole of a fuel cell to be connected to a circular external pipe and smoothly distributes a reactant gas through the connection.

A fuel cell stack according to the present disclosure includes a plurality of fuel cells in each of which separators and an electrolyte membrane-electrode assembly in which electrodes are provided on two sides of an electrolyte membrane are stacked. The plurality of fuel cells is stacked, with end plates disposed on two ends in the stacking direction. Each fuel cell is provided with a reactant gas communication hole that is a non-circular communication hole and that causes a reactant gas to flow in a stacking direction of the fuel cells.

One of the end plates is provided with a manifold member made of resin that connects the reactant gas communication hole and the circular external pipe. The manifold member made of resin includes a connecting portion having a non-circular opening portion that is provided within one of the end plates and that communicates with the reactant gas communication hole and that is substantially the same in shape as the reactant gas communication hole and a pipe-connecting portion having a circular opening portion that communicates with the circular external pipe. In a front view of the one of the end plates, the non-circular opening portion is disposed within an area covered by the circular opening portion.

In this fuel cell stack, the non-circular opening portion may be offset from a center of the circular opening portion toward an outside of the one of the end plates.

According to the present disclosure, the manifold member made of resin effectively reduces the pressure loss of a reactant gas between the non-circular reactant gas communication hole of the fuel cell and the circular external pipe that is provided outside the fuel cell stack. Furthermore, in a front view of the one of the end plates, the non-circular opening potion is disposed within an area covered by the circular opening portion. Therefore, it becomes possible to cause the reactant gases to smoothly flow while adopting a simple and economical construction.

DETAILED DESCRIPTION

Figure 1:
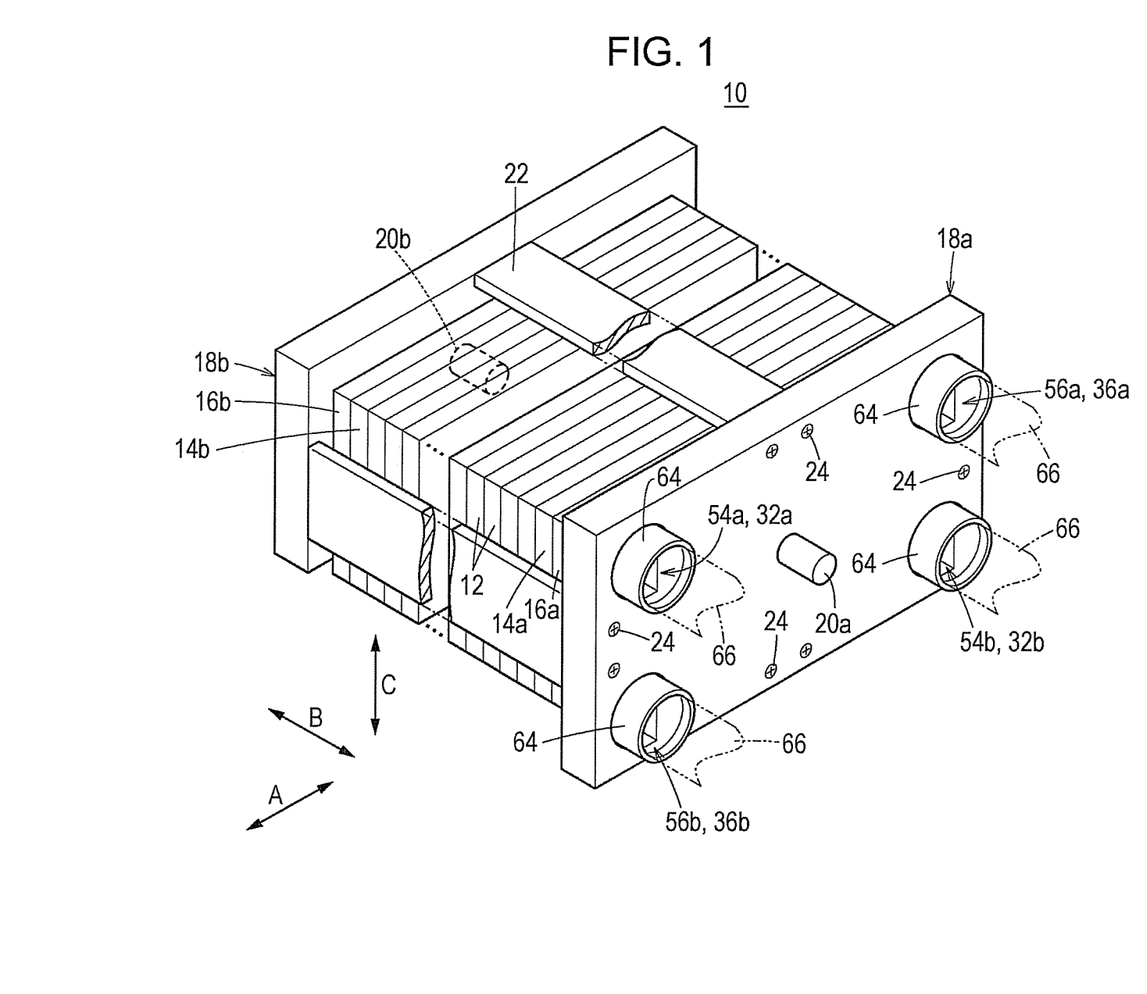
FIG. 1 is a schematic perspective illustration of a fuel cell stack in a view from a first end plate side according to an embodiment of the present disclosure.

As illustrated in FIG. 1, a fuel cell stack 10 according to an embodiment of the present disclosure is, for example, mounted in a fuel cell electric motor vehicle (not shown in the drawings). In the fuel cell stack 10, a plurality of fuel cells 12 are stacked in a horizontal direction (a direction indicated by an arrow B), with electrode surfaces being in an upstanding posture. Note that the fuel cells 12 may instead be stacked in the gravity direction (a direction indicated by an arrow C) to form the fuel cell stack 10.

At an end in the stacking direction of the fuel cells 12, a first terminal plate 14a, a first insulating plate 16a, and a first end plate 18a are disposed in this order toward the outer side. At the opposite end in the stacking direction of the fuel cells 12, a second terminal plate 14b, a second insulating plate 16b, and a second end plate 18b are disposed in this order toward the outer side.

A first electric power output terminal 20a connected to the first terminal plate 14a extends outward from a central portion of the rectangular first end plate 18a. A second electric power output terminal 20b connected to the second terminal plate 14b extends outward from a central portion of the rectangular second end plate 18b.

Each pair of corresponding sides of the rectangular first end plate 18a and the rectangular second end plate 18b are interconnected by a connecting bar 22 whose two ends are fixed to the pair of corresponding sides by screws 24, so that the plurality of stacked fuel cells 12 is given a fastening load in the stacking directions (directions indicated by the arrows B).

Figure 2:
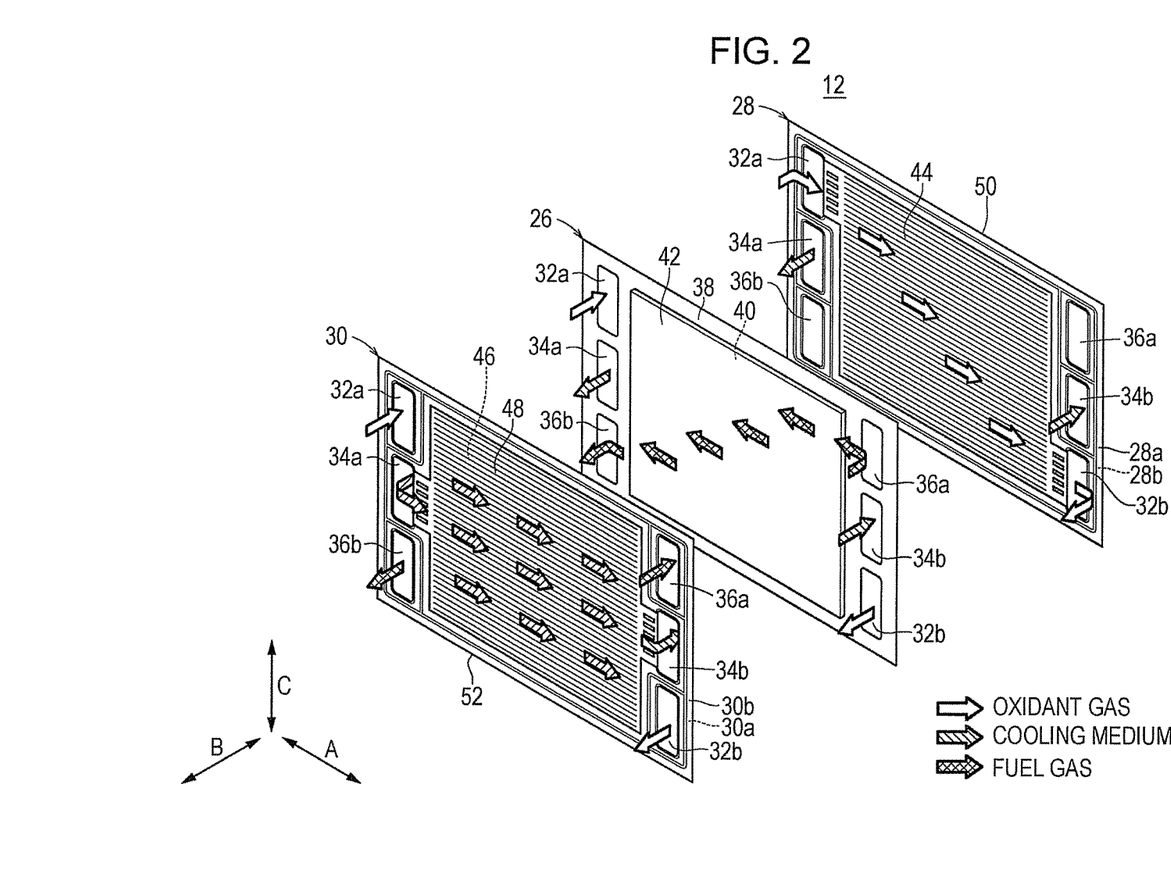
FIG. 2 is an exploded perspective illustration of portions of a fuel cell that constitutes the fuel cell stack.

As illustrated in FIG. 2, each fuel cell 12 includes an electrolyte membrane-electrode assembly 26 and a cathode separator 28 and an anode separator 30 that are disposed on opposite sides of the electrolyte membrane-electrode assembly 26.

The cathode separator 28 and the anode separator 30 are each made of, for example, a steal sheet, a stainless steel sheet, an aluminum sheet, a plated steel sheet, or a metal sheet whose metal surfaces have been subjected to an anti-corrosion surface treatment. The cathode separator 28 and the anode separator 30 have a rectangular planar shape (including a square planar shape) and are formed by the press working of a metal thin sheet into a corrugated shape so that the cathode separator 28 and the anode separator 30 have a projections-and-depressions sectional shape. Incidentally, the cathode separator 28 and the anode separator 30 do not need to be metal separators but may be, for example, carbon separators.

An end edge portion of the rectangular fuel cell 12 in a direction of a longitudinal side thereof (the direction indicated by one of the arrows A) is provided with oxidant gas inlet communication holes (reactant gas communication holes) 32a, cooling medium inlet communication holes 34a, and fuel gas outlet communication holes (reactant gas communication holes) 36b that respectively communicate with each other in the directions of the arrows B. The oxidant gas inlet communication holes 32a supply the oxidant gas, for example, an oxygen-containing gas. The cooling medium inlet communication holes 34a supply a cooling medium. The fuel gas outlet communication holes 36b discharge the fuel gas, for example, a hydrogen-containing gas. The oxidant gas inlet communication holes 32a, the cooling medium inlet communication holes 34a, and the fuel gas outlet communication holes 36b are non-circular communication holes, for example, rectangular communication holes. However, the shape of these communication holes 32a, 34a and 36b can be set to various shapes, such as a square shape, a trapezoidal shape, a pentagonal shape, a generally triangular shape, a polygonal shape, or a rhombic shape, and is not particularly limited. Furthermore, corner portions between adjacent sides of the non-circular (e.g., rectangular) communication holes are preferred to be rounded (curved).

An opposite end edge portion of the rectangular fuel cell 12 in the longitudinal-side direction is provided with fuel gas inlet communication holes (reactant gas communication holes) 36a, cooling medium outlet communication holes 34b, and oxidant gas outlet communication holes (reactant gas communication holes) 32b that respectively communicate with each other in the directions of the arrows B. The fuel gas inlet communication holes 36a supply the fuel gas, the cooling medium outlet communication holes 34b discharge the cooling medium, and the oxidant gas outlet communication holes 32b discharge the oxidant gas. The fuel gas inlet communication holes 36a, the cooling medium outlet communication holes 34b, and the oxidant gas outlet communication holes 32b are non-circular communication holes, similar to the oxidant gas inlet communication holes 32a, the cooling medium inlet communication holes 34a, and the fuel gas outlet communication holes 36b.

The electrolyte membrane-electrode assembly 26 includes, for example, a solid polymer electrolyte membrane 38 of which a thin film of perfluorosulfonic acid has been impregnated with water, and a cathode electrode 40 and an anode electrode 42 that are disposed on opposite sides of the solid polymer electrolyte membrane 38.

The cathode electrode 40 and the anode electrode 42 each include a gas diffusion layer (not shown in the drawings) made of a carbon paper or the like. Porous carbon particles whose surfaces are loaded with a catalyst such as a platinum alloy are uniformly applied to a surface of the gas diffusion layer to form an electrode catalyst layer (not shown). The electrode catalyst layer is formed on each of the two opposite sides of the solid polymer electrolyte membrane 38.

An electrolyte membrane-electrode assembly 26-facing surface 28a of the cathode separator 28 is provided with an oxidant gas channel (reactant gas channel) 44 that communicates with the oxidant gas inlet communication hole 32a and the oxidant gas outlet communication hole 32b. The oxidant gas channel 44 is formed by a plurality of linear channel grooves (or corrugated channel grooves) that extend in the directions of the arrows A.

An electrolyte membrane-electrode assembly 26-facing surface 30a of the anode separator 30 is provided with a fuel gas channel (reactant gas channel) 46 that communicates with the fuel gas inlet communication hole 36a and the fuel gas outlet communication hole 36b. The fuel gas channel 46 is formed by a plurality of linear channel grooves (or corrugated channel grooves) that extend in the directions of the arrows A.

Between the surface 30b of the anode separator 30 and an adjacent surface 28b of the cathode separator 28 there is formed a cooling medium channel 48 that communicates with the cooling medium inlet communication hole 34a and the cooling medium outlet communication hole 34b. The cooling medium channel 48 extends horizontally, and distributes the cooling medium over an electrode region of the electrolyte membrane-electrode assembly 26.

The surfaces 28a and 28b of the cathode separator 28 have been formed together with a first seal member 50 that extends round an outer peripheral end edge portion of the cathode separator 28. The surfaces 30a and 30b of the anode separator 30 have been formed together with a second seal member 52 that extends round an outer peripheral end edge portion of the anode separator 30.

The first seal member 50 and the second seal member 52 are, for example, seal members having elasticity that are made of a sealing material, a cushion material, a packing material, etc., such as EPDM (ethylene propylene diene monomer rubber), NBR (nitrile-butadiene rubber), a fluorocarbon rubber, a silicone rubber, a fluorosilicone rubber, a butyl rubber, a natural rubber, a styrene rubber, a chloroprene or acryl rubber.

As shown in FIG. 1, an oxidant gas supply manifold member 54a, an oxidant gas discharge manifold member 54b, a fuel gas supply manifold member 56a, and a fuel gas discharge manifold member 56b are attached to the first end plate 18a. The oxidant gas supply manifold member 54a, the oxidant gas discharge manifold member 54b, the fuel gas supply manifold member 56a, and the fuel gas discharge manifold member 56b are each formed from a resin material. The resin material used for these manifold members is, for example, PBT (polybutylene terephthalate), PPS (polyphenylene sulfide), PPE (polyphenylene ether), PAI (polyamide imide), etc.

Figure 3:
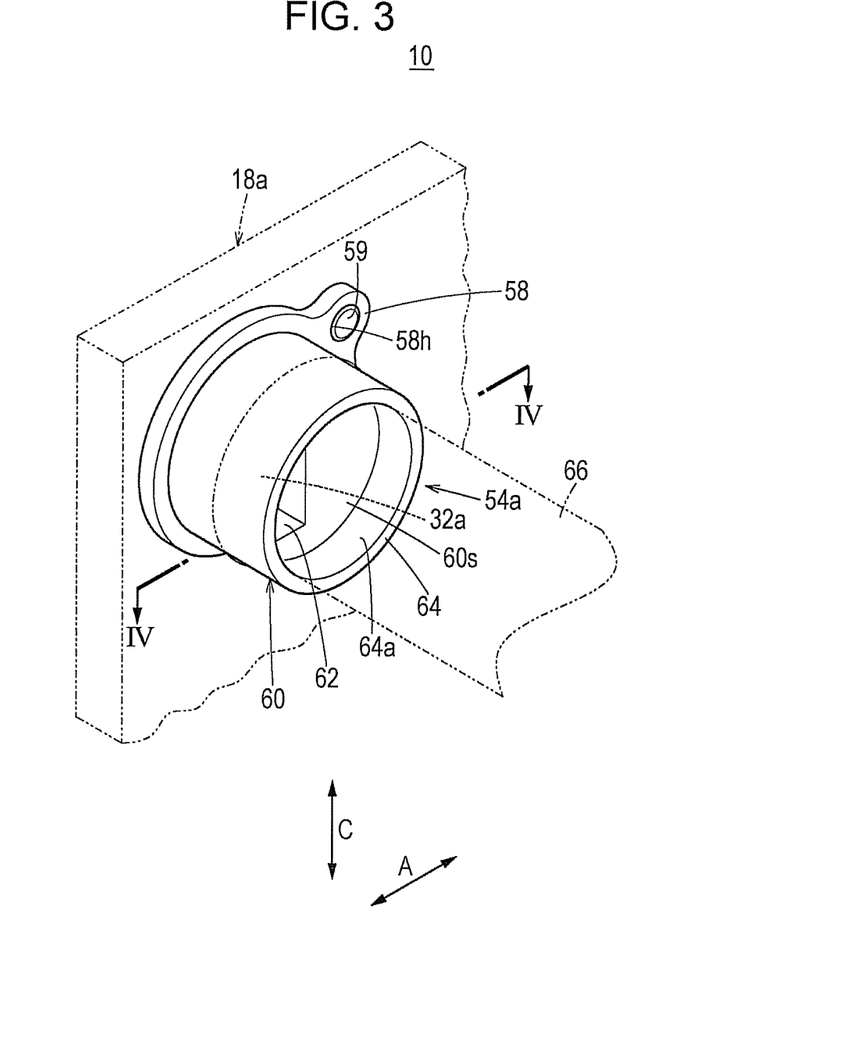
FIG. 3 is a perspective illustration of an oxidant gas supply manifold member that constitutes the fuel cell stack.
Figure 4:
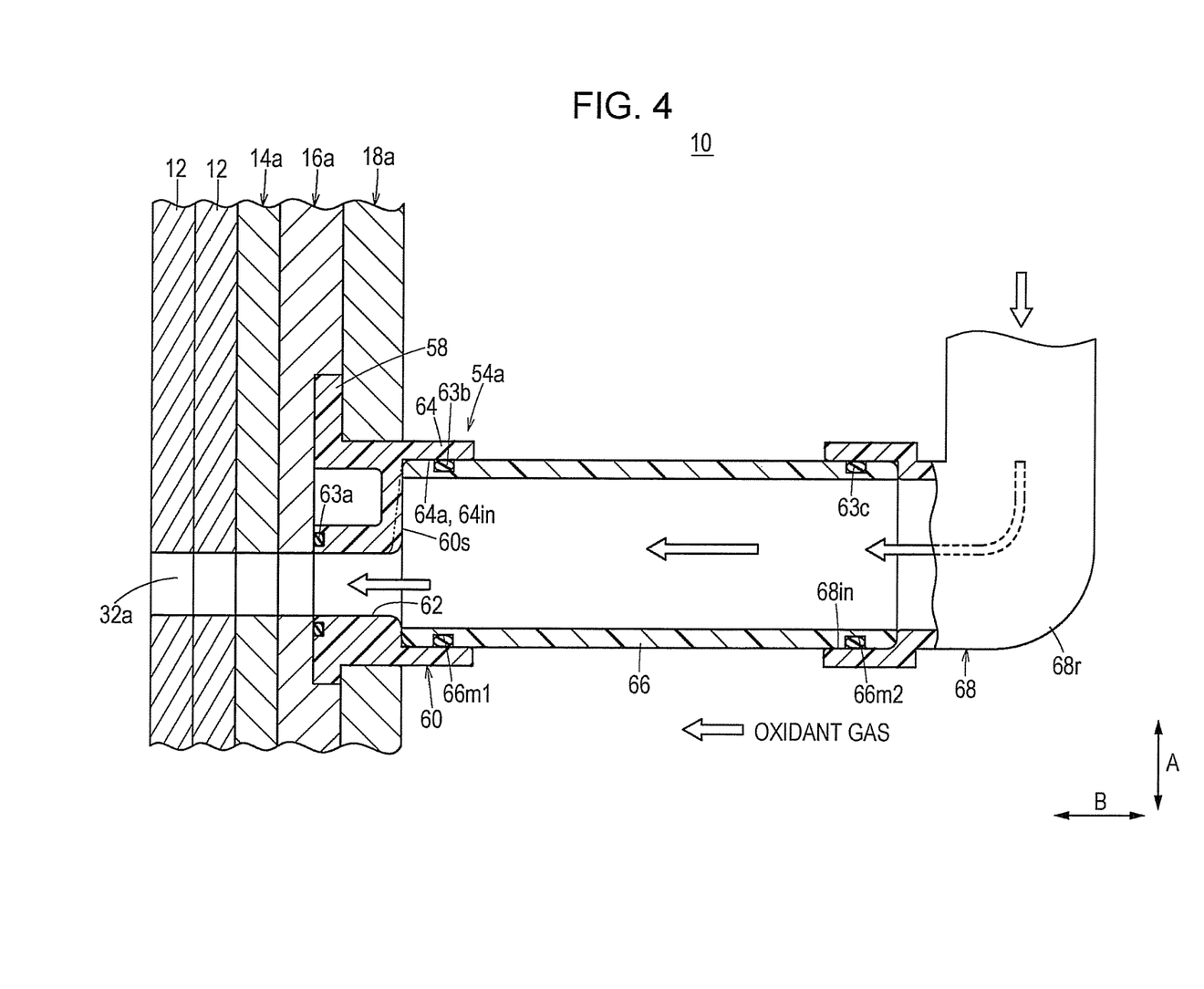
FIG. 4 is a sectional view of the oxidant gas supply manifold member and the first end plate taken along IV-IV line in FIG. 3.

As shown in FIG. 3 and FIG. 4, the oxidant gas supply manifold member 54a has a flange portion 58 that is sandwiched between the first insulating plate 16a and the first end plate 18a. The flange portion 58 is provided with a hole portion 58h into which a positioning knock pin 59 is inserted (see FIG. 3). The flange portion 58 is formed on an end of a hollow cylindrical body portion (connecting portion) 60, integrally with the body portion 60. The body portion 60 is provided with a non-circular opening portion 62 that has an opening in a flange portion 58-side end portion. On a reverse surface side of the flange portion 58 (the opposite side to the body portion 60) there is disposed a seal member 63a that extends circumferentially around the oxidant gas inlet communication hole 32a.

Figure 5:
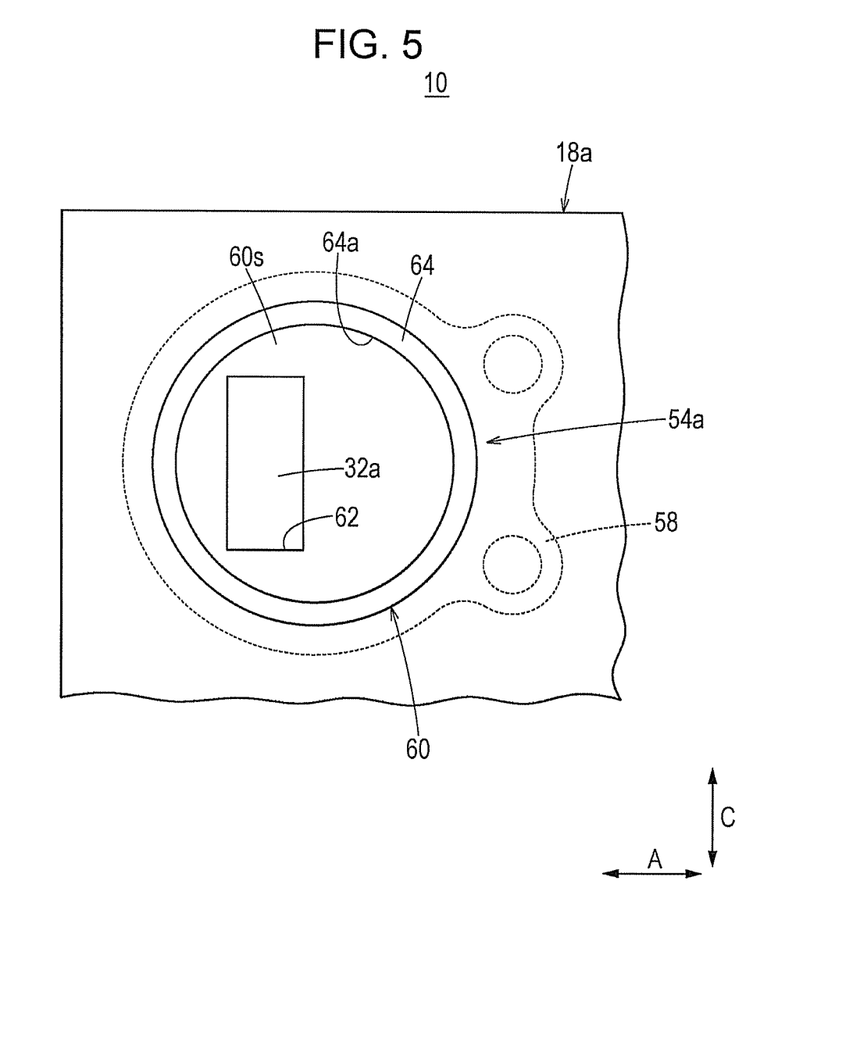
FIG. 5 is a front-view illustration of the oxidant gas supply manifold member.

The non-circular opening portion 62 is offset from the center of an inner wall surface 60s of the body portion 60 toward an outside of the first end plate 18a (see FIG. 3 and FIG. 5). As shown in FIG. 4, the inner wall surface 60s of the body portion 60 is a flat surface, but may have an inclination (see a two-dot chain line in FIG. 4). Non-circular opening portion 62-side corner portions of the inner wall surface 60s have a round shape. The non-circular opening portion 62 has the same shape as the oxidant gas inlet communication hole 32a, and coincides with the oxidant gas inlet communication hole 32a in a view in the stacking direction (i.e., communicates therewith).

A hollow cylinder portion (pipe-connecting portion) 64 is formed integrally with an opposite end portion of the body portion 60 to the flange portion 58. The hollow cylinder portion 64 is provided with a circular opening portion 64a. As shown in FIG. 5, in a front view of the first end plate 18a, the non-circular opening portion 62 is disposed within the circular opening portion 64a and eccentrically toward the outside of the first end plate 18a. As shown in FIG. 4, an external appliance 68, such as an open-close valve or a fluid pressure appliance, is connected to the hollow cylinder portion 64 via a circular external pipe (joint cylinder body) 66. That is, the area of the non-circular opening portion 62 is smaller than an area of the circular opening portion 64a. For example, an area of the non-circular opening portion 62 is at least 25% smaller than an area of the circular opening portion 64a. In another example, an area of the non-circular opening portion 62 is at least 50% smaller than an area of the circular opening portion 64a.

An outer periphery of an end side portion of the circular external pipe 66 is provided with a seal groove 66m1. A seal member 63b is interposed between the seal groove 66m1 and an inner peripheral portion 64in of the hollow cylinder portion 64. An outer periphery of an opposite end side portion of the circular external pipe 66 is provided with a seal groove 66m2. A seal member 63c is interposed between the seal groove 66m2 and an inner peripheral portion 68in of an end portion of the external appliance 68. The external appliance 68 has a bent portion 68r. Incidentally, instead of the seal grooves 66m1 and 66m2 of the circular external pipe 66, seal grooves may be formed in the inner peripheral portion 64in of the hollow cylinder portion 64 and the inner peripheral portion 68in of the end portion of the external appliance 68.

Incidentally, the oxidant gas discharge manifold member 54b, the fuel gas supply manifold member 56a, and the fuel gas discharge manifold member 56b are constructed in substantially the same manner as the oxidant gas supply manifold member 54a. Like components are denoted by like reference characters, and detailed descriptions thereof are not repeated.

Although not illustrated in the drawings, the second end plate 18b is provided with a cooling medium supply manifold member that communicates with the cooling medium inlet communication hole 34a and a cooling medium discharge manifold member that communicates with the cooling medium outlet communication hole 34b.

Operations of the fuel cell stack 10 constructed as described above will be described below.

First, as shown in FIG. 1, the oxidant gas, such as an oxygen-containing gas, is supplied from the oxidant gas supply manifold member 54a of the first end plate 18a into the oxidant gas inlet communication hole 32a. The fuel gas, such as a hydrogen-containing gas, is supplied from the fuel gas supply manifold member 56a of the first end plate 18a into the fuel gas inlet communication hole 36a.

On the second end plate 18b side, on the other hand, the cooling medium, such as pure water, ethylene glycol, or oil, is supplied from the cooling medium supply manifold member (not shown) into the cooling medium inlet communication hole 34a.

Therefore, in each fuel cell 12, as indicated in FIG. 2, the oxidant gas is introduced from the oxidant gas inlet communication hole 32a into the oxidant gas channel 44 of the cathode separator 28. The oxidant gas moves along the oxidant gas channel 44 in the direction of one of the arrows A, and thus is supplied to the cathode electrode. 40 of the electrolyte membrane-electrode assembly 26.

The fuel gas is supplied from the fuel gas inlet communication hole 36a into the fuel gas channel 46 of the anode separator 30 in each fuel cell 12. The fuel gas moves along the fuel gas channel 46 in the direction of the other one of the arrows A, and thus is supplied to the anode electrode 42 of the electrolyte membrane-electrode assembly 26.

Therefore, in the electrolyte membrane-electrode assembly 26, the oxidant gas supplied to the cathode electrode 40 and the fuel gas supplied to the anode electrode 42 are consumed by an electrochemical reaction in the electrode catalyst layer, whereby electricity is generated.

Next, the oxidant gas after being supplied to and consumed on the cathode electrode 40 of the electrolyte membrane-electrode assembly 26 flows along the oxidant gas outlet communication hole 32b in the direction indicated by an arrow B, and is discharged from the oxidant gas discharge manifold member 54b (see FIG. 1). On the other hand, the fuel gas after being supplied to and consumed on the anode electrode 42 of the electrolyte-membrane-electrode assembly 26 flows along the fuel gas outlet communication hole 36b in the direction of the arrow B, and is discharged from the fuel gas discharge manifold member 56b.

Furthermore, as indicated in FIG. 2, the cooling medium supplied to the cooling medium inlet communication hole 34a is introduced into the cooling medium channel 48 between the cathode separator 28 and the anode separator 30. The cooling medium moves in the direction of an arrow A, cooling the electrolyte membrane-electrode assembly 26, and then is discharged into the cooling medium outlet communication hole 34b. The cooling medium is discharged from the second end plate 18b.

In this case, in this embodiment, as shown in FIG. 3 to FIG. 5, the oxidant gas supply manifold member 54a is provided with the non-circular opening portion 62 and the circular opening portion 64a that communicate with each other. The non-circular opening portion 62 communicates with the non-circular oxidant gas inlet communication hole 32a of each fuel cell 12, and the circular opening portion 64a communicates with the circular external pipe 66. Therefore, the pressure loss of the oxidant gas between the non-circular oxidant gas inlet communication holes 32a of the fuel cells 12 and the circular external pipe 66 is effectively reduced.

Furthermore, in a front view of the first end plate 18a, the non-circular opening portion 62 is disposed within an area covered by the circular opening portion 64a (see FIG. 5). Therefore, this embodiment achieves an advantageous effect of enabling smooth flow of the oxidant gas while adopting a simple and economical construction.

In particular, the non-circular opening portion 62 is offset from the center of the body portion 60 toward an outside of the first end plate 18a. Thus, as indicated in FIG. 4, the oxidant gas introduced from the external appliance 68 into the circular external pipe 66 can smoothly flow into the non-circular opening portion 62 that is provided in a portion of the oxidant gas supply manifold member 54a which is offset toward the outside of the first end plate 18a. Therefore, the oxidant gas is advantageously supplied into the oxidant gas inlet communication hole 32a in a favorable and reliable manner.

Note that the oxidant gas discharge manifold member 54b, the fuel gas supply manifold member 56a, and the fuel gas discharge manifold member 56b achieve substantially the same effects as the oxidant gas supply manifold member 54a.

What is claimed is:

1. A fuel cell stack that includes a plurality of fuel cells in each of which separators and an electrolyte membrane-electrode assembly in which electrodes are provided on two sides of an electrolyte membrane are stacked, wherein the plurality of fuel cells is stacked, with end plates disposed on front and rear ends in the stacking direction, and each fuel cell is provided with a reactant gas communication hole that is a non-circular communication hole and that causes a reactant gas to flow in a stacking direction of the fuel cells, and wherein one of the end plates is provided with a manifold member made of resin that connects the reactant gas communication hole and the circular external pipe, and the manifold member made of resin includes a connecting portion having a non-circular opening portion that is provided within the one of the end plates and that communicates with the reactant gas communication hole and that is substantially the same in shape as the reactant gas communication hole, and a pipe-connecting portion having a circular opening portion that communicates with the circular external pipe, and wherein in a front view of the one of the end plates taken along the stacking direction, the non-circular opening portion provided within the one of the end plates is disposed within an area covered by the circular opening portion, the circular opening portion having a diameter so great that an entire cross-section of the non-circular opening portion is encompassed by the circular opening portion, and the non-circular opening portion provided within the one of the end plates is offset from a center of the circular opening portion toward an outside periphery of the one of the end plates in a widthwise direction.

2. The fuel cell stack according to claim 1, wherein an area of the non-circular opening portion of the connecting portion of the manifold member is smaller than an area of the circular opening portion of the pipe-connecting portion.

3. The fuel cell stack according to claim 1, wherein an area of the non-circular opening portion of the connecting portion of the manifold member is at least 25% smaller than an area of the circular opening portion of the pipe-connecting portion.

4. The fuel cell stack according to claim 1, wherein an area of the non-circular opening portion of the connecting portion of the manifold member is at least 50% smaller than an area of the circular opening portion of the pipe-connecting portion.

5. The fuel cell stack according to claim 1, wherein the non-circular opening portion of the connecting portion of the manifold member has a rectangular shape.

6. The fuel cell stack according to claim 5, wherein the rectangular shape of the non-circular opening portion has rounded corners.

7. The fuel cell stack according to claim 1, wherein the non-circular opening portion of the connecting portion of the manifold member has a polygonal shape.

8. The fuel cell stack according to claim 1, wherein the front end plate is provided with two manifold members, each manifold member including a connecting portion having a non-circular opening portion, the fuel cell stack including two pipe-connecting portions each having a circular opening portion, in the front view of the front end plate, each non-circular opening portion is disposed within a corresponding area covered by one of the two circular opening portions.

9. The fuel cell stack according to claim 8, wherein one of the non-circular opening portions communicates with an oxidant gas communication hole and the other one of the non-circular opening portions communicates with a fuel gas communication hole.

10. The fuel cell stack according to claim 1, wherein the front and rear end plates are each provided with two manifold members, each manifold member including a connecting portion having a non-circular opening portion, the fuel cell stack including four pipe-connecting portions each having a circular opening portion, in the front or rear view of the front or end end plate, each non-circular opening portion is disposed within a corresponding area covered by one of the four circular opening portions.

* * * * *